US011722963B2

United States Patent
McGill et al.

(10) Patent No.: US 11,722,963 B2
(45) Date of Patent: Aug. 8, 2023

(54) METHOD OF CONSERVING POWER OF A BATTERY IN A BATTERY-POWERED ELECTRONIC DEVICE, AND ELECTRONIC DEVICE FOR PERFORMING THE METHOD IN A WIRELESS LOCAL AREA NETWORK

(71) Applicant: Arlo Technologies, Inc., Carlsbad, CA (US)

(72) Inventors: Chris McGill, San Diego, CA (US); Nanjian Qian, San Diego, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 74 days.

(21) Appl. No.: 17/188,420

(22) Filed: Mar. 1, 2021

(65) Prior Publication Data
US 2021/0274444 A1    Sep. 2, 2021

Related U.S. Application Data

(60) Provisional application No. 62/983,202, filed on Feb. 28, 2020.

(51) Int. Cl.
| | |
|---|---|
| *H04B 7/185* | (2006.01) |
| *H04W 52/02* | (2009.01) |
| *H04W 8/00* | (2009.01) |
| *H04W 8/12* | (2009.01) |
| *H04W 36/32* | (2009.01) |
| *H04W 84/12* | (2009.01) |

(52) U.S. Cl.
CPC ....... *H04W 52/0241* (2013.01); *H04W 8/005* (2013.01); *H04W 8/12* (2013.01); *H04W 36/32* (2013.01); *H04W 84/12* (2013.01)

(58) Field of Classification Search
CPC .............................................. H04M 2215/2033
USPC .......................................................... 370/318
See application file for complete search history.

(56) References Cited

U.S. PATENT DOCUMENTS

| | | | |
|---|---|---|---|
| 5,794,146 A | 8/1998 | Sevcik et al. | |
| 7,848,271 B2 * | 12/2010 | Salomone | H04W 52/0225 370/328 |
| 8,885,627 B2 | 11/2014 | Gong | |
| 9,307,467 B2 * | 4/2016 | Balakrishnan | H04W 48/18 |
| 9,326,230 B2 * | 4/2016 | Homchaudhuri | H04W 48/20 |
| 9,560,579 B2 * | 1/2017 | Batta | H04W 36/08 |
| 9,713,084 B2 | 7/2017 | Skeoch et al. | |
| 9,716,995 B2 * | 7/2017 | He | H04W 48/16 |
| 9,749,942 B2 * | 8/2017 | Katar | H04W 36/0094 |
| 9,974,013 B2 * | 5/2018 | Homchaudhuri | H04W 48/20 |
| 10,375,648 B2 * | 8/2019 | Skeoch | H04W 52/0254 |
| 10,475,320 B2 * | 11/2019 | Harrod, IV | G08B 3/10 |
| 2008/0020748 A1 * | 1/2008 | Parker | H04W 76/19 455/423 |
| 2008/0186917 A1 | 8/2008 | Wu et al. | |

(Continued)

*Primary Examiner* — Amancio Gonzalez
(74) *Attorney, Agent, or Firm* — Boyle Fredrickson S.C.

(57) ABSTRACT

A method of and system for conserving power of a battery in a battery-powered electronic device are disclosed. The electronic device, which can be a digital camera, is wirelessly communicable with one or more access points over a wireless local area network. The electronic device is also wirelessly communicable over a plurality of frequency channels in one or more frequency bands. The method of conserving power relates to an improved roaming process. Also disclosed are an electronic device and a system for performing the method.

20 Claims, 5 Drawing Sheets

(56) References Cited

U.S. PATENT DOCUMENTS

2020/0029271 A1    1/2020  Sood et al.
2021/0282075 A1*   9/2021  Gwak ................... H04W 88/06
2022/0159558 A1*   5/2022  Zhang ................... H04W 24/10

* cited by examiner

METHOD OF CONSERVING POWER OF A BATTERY IN A BATTERY-POWERED ELECTRONIC DEVICE, AND ELECTRONIC DEVICE FOR PERFORMING THE METHOD IN A WIRELESS LOCAL AREA NETWORK

CROSS-REFERENCE TO RELATED APPLICATIONS

This application claims the benefit of provisional patent application U.S. App. No. 62/983,202 filed on Feb. 28, 2020 and entitled "Method of Conserving Power of a Battery in a Battery Powered Electronic Device, and Electronic Device for Performing the Method in a Wireless Local Area Network," the entire contents of which are hereby expressly incorporated by reference into the present application.

BACKGROUND OF THE INVENTION

1. Field of the Invention

The present invention relates to a system and method of conserving power of a battery in a battery-powered electronic device. The present invention more particularly relates to a battery-powered electronic device in a wireless local area network using an improved roaming technique for conserving the battery.

2. Discussion of the Related Art

Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Arlo Industries, Inc., the content of which is incorporated herein by reference. The wireless camera can be connected to a Wi-Fi™ enable base station (BS) or access point (AP). The base station or access point may be a wireless router having "dual-band" support. For example, a base station having dual-band support offers communication that encodes and decodes radio waves at both the 2.4 GHz and 5 GHz frequencies.

As is known, communication using radio waves at 2.4 GHz versus 5 GHz has certain advantages and disadvantages. More information can be communicated over radio waves at 5 GHz than over 2.4 GHz, but radio waves at 2.4 GHz can travel farther through a building, for example, than radio waves at 5 GHz. Accordingly, a wireless enabled electronic device, such as a Wi-Fi™ enabled video camera, may transition communication with a base station between radio waves at 2.4 GHz and 5 GHz. The transitioning between radio waves at 2.4 GHz and 5 GHz may be referred to as roaming. Alternatively, roaming can be used to find a better access point in order to provide better service for the client (e.g., high data throughput support, better coverage range, etc.)

Roaming between 2.4 GHz and 5 GHz or between two access points can cause higher power consumption for a battery-powered electronic device than if no roaming occurs. However, roaming may be necessary and/or beneficial depending upon the needs of the circumstance. The problem may be exasperated when the battery-powered electronic device is near a transition point, for example between the 2.4 GHz and 5 GHz network. Accordingly, a need exists to allow for roaming between dual-band networks or dual access points while trying to minimize battery power.

SUMMARY OF THE INVENTION

In one aspect, a method of conserving power of a battery in a battery-powered electronic device is disclosed. The electronic device is wirelessly communicable over a plurality of frequency channels with an access point in a wireless local area network. The method includes triggering a first roaming scan with the electronic device for communication with the access point over the WLAN, scanning one or more of the plurality of frequency channels during the first roaming scan, determining the first roaming scan is unsuccessful, placing the electronic device in a low power state for a time period after the first roaming scan is unsuccessful, and after the time period lapses, scanning the one or more of the plurality of frequency channels during a second roaming scan.

In a further aspect, the method can also include, determining the second roaming scan is unsuccessful, placing the electronic device in a power saving mode for a second time period, the second time period being longer than the first time period, and after the second time period lapses, scanning the one or more of the plurality of frequency channels during a third roaming scan Another aspect of the present invention provides a digital video camera in wireless communication with an access point via a wireless network. The camera includes a lens, an image capture element, an antenna, and a processor, and a memory communicably coupled to the processor. The memory stores a roaming trigger module and a roaming scan module. The roaming trigger module includes instruction, that when executed by the processor, cause the processor to trigger a roaming scan with the electronic device for communication with the access point over the WLAN. The roaming scan module includes instruction, that when executed by the processor, cause the processor to scan one or more of the plurality of frequency channels during a first roaming scan; determine the first roaming scan is unsuccessful; place the electronic device in a low power state for a first time period; after the time period lapses, scan the one or more of the plurality of frequency channels during a second roaming scan; determine the second roaming scan is unsuccessful; and place the electronic device in the power saving mode for a second time period, the second time period being longer than the first time period.

In a further aspect, the memory of the camera can also include, a roaming handoff module. The roaming handoff module includes instruction, that when executed by the processor, cause the processor to transition to a selected communication channel with the access point when the roaming scan is successful.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
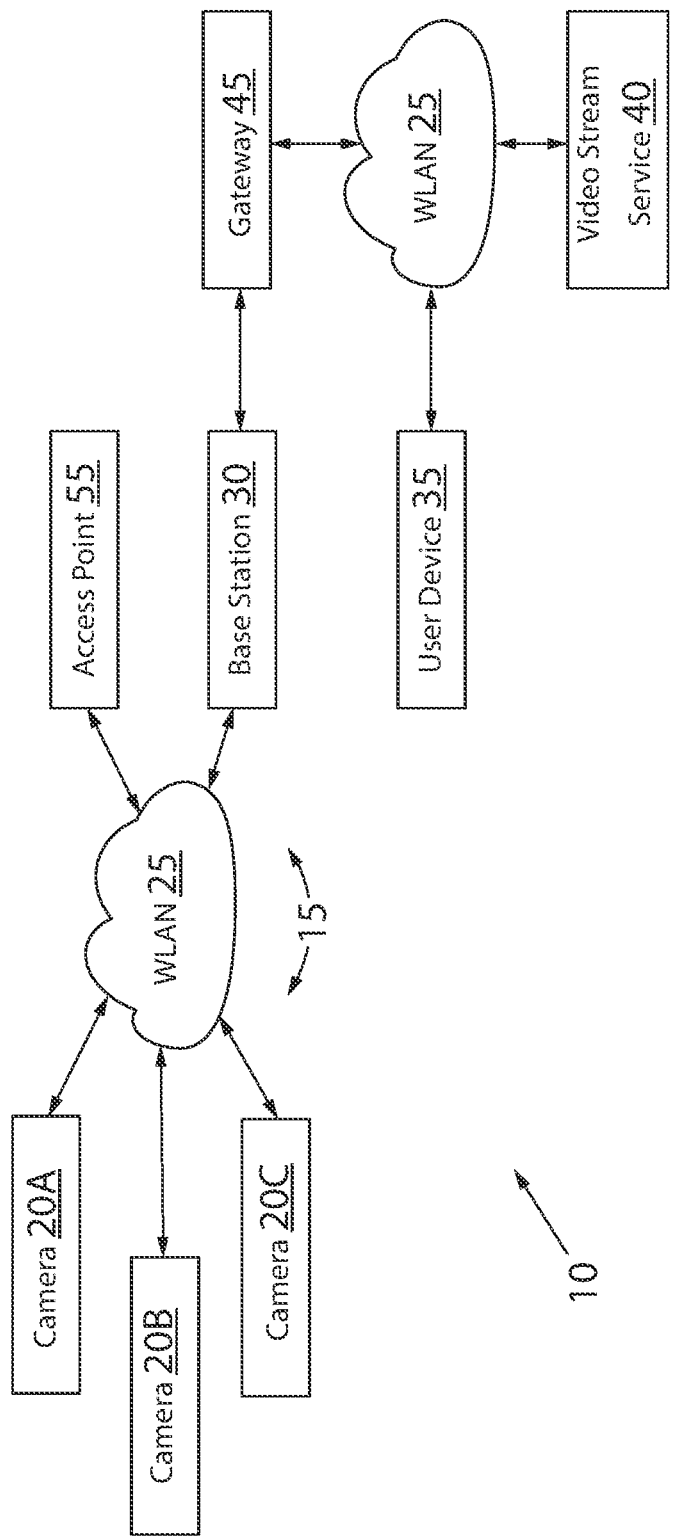
FIG. 1 is block diagram representing a system for capturing, transmitting, and displaying images according to aspects of the invention.

FIG. 1 represents a system 10 for capturing, transmitting, and displaying images, such as images of a video. The video is acquired at a first location and displayed at a second location. The shown system 10 includes a wireless camera network 15 having a plurality of wireless node cameras 20A-C transmitting and receiving wireless signals to and from an access point (AP) via the wireless network 25. One access point is shown as a base station 30 (or router). Although three cameras 20A-C are shown in FIG. 1, a system can have more or fewer cameras. The system 10 also includes a remote electronic device, which is shown as a mobile user device 35, and a video stream service 40. The user device 35 and the video stream service 40 are in communication with the base station 30 via a gateway 45 and the Internet 50. It is contemplated that many different arrangements are possible for the system 10, and the shown system 10 is provided for ease of explanation. For example, the base station 30 may be one component of a larger wired and/or wireless local area network (LAN) having many access points communicating with the cameras 20A-C. As a more specific example, a second access point 55 is shown and may be wired or wirelessly connected to the base station 30.

The cameras 20A-C are in communication with the base station 30 or the access point 55. The base station 30 and the access point 55 host a private local area network, which is shown as the wireless local area network (WLAN) 25. The WLAN 25 of one implantation is an IEEE 802.11 local area network (LAN) that follows the network protocols of the Wi-Fi™ Alliance. Such a network is typically referred to as a Wi-Fi™ network. However, the WLAN 25 can be or include other wireless local area networks.

The base station 30 in some implementations can provide multiple private local area networks at multiple broadcast frequencies or provide one network at multiple broadcast frequencies. In other words, the base station 30 can be a dual-band base station that broadcasts on a first frequency and a second frequency. For example, the first broadcast frequency can be at 2.4 GHz and the second broadcast frequency can be at 5 GHz, which will be the example frequencies used throughout the remainder of this detail description. Other frequencies and more frequencies are possible. The dual-band base station 30 can provide a first network at the 2.4 GHz broadcast frequency and a second first network at the 5 GHz broadcast frequency. Alternatively, the dual-band base station 30 can provide a single network at both the 2.4 GHz broadcast frequency and the 5 GHz broadcast frequency, simultaneously. It is also envisioned that the access point 55 can provide similar or different network(s) as the base station 30. When the dual-band station 30 and/or the access point 55 simultaneously broadcast the same network on multiple frequency, the network defaults to the same configuration (SSID/security) on both frequencies to allow easy frequency band roaming among both frequency bands.

Electronic devices communicate data to and from the cameras 20A-C. One example electronic device is the mobile user device 35. Exemplary mobile user devices can be a smart phone, tablet computer, or a laptop computer, etc. The electronic device can alternatively be a stationary user device. A stationary user device, such as a desktop computer, is an electronic device that is generally considered by one skilled in the art as stationary even though the device can move. The communication between the electronic devices and the cameras 20A-C is predominately indirect communication.

Another electronic device that communicates data to and from the camera is the video stream service 40. The video stream service 40 can be a commercially available service for storing and/or analyzing the images and/or video. Exemplary analyzing services include enabling the camera to differentiate between humans and animals, reducing false motion notifications, sending alerts and screenshots to the user device 35, etc. The video stream service 40 can also provide a secure gateway for video to be communicated from the cameras 20A-C to the user device 35. An exemplary video stream service 40 is Arlo's Smart™ video stream service available from Arlo Technologies, Inc. in San Jose, Calif., U.S.

Figure 2:
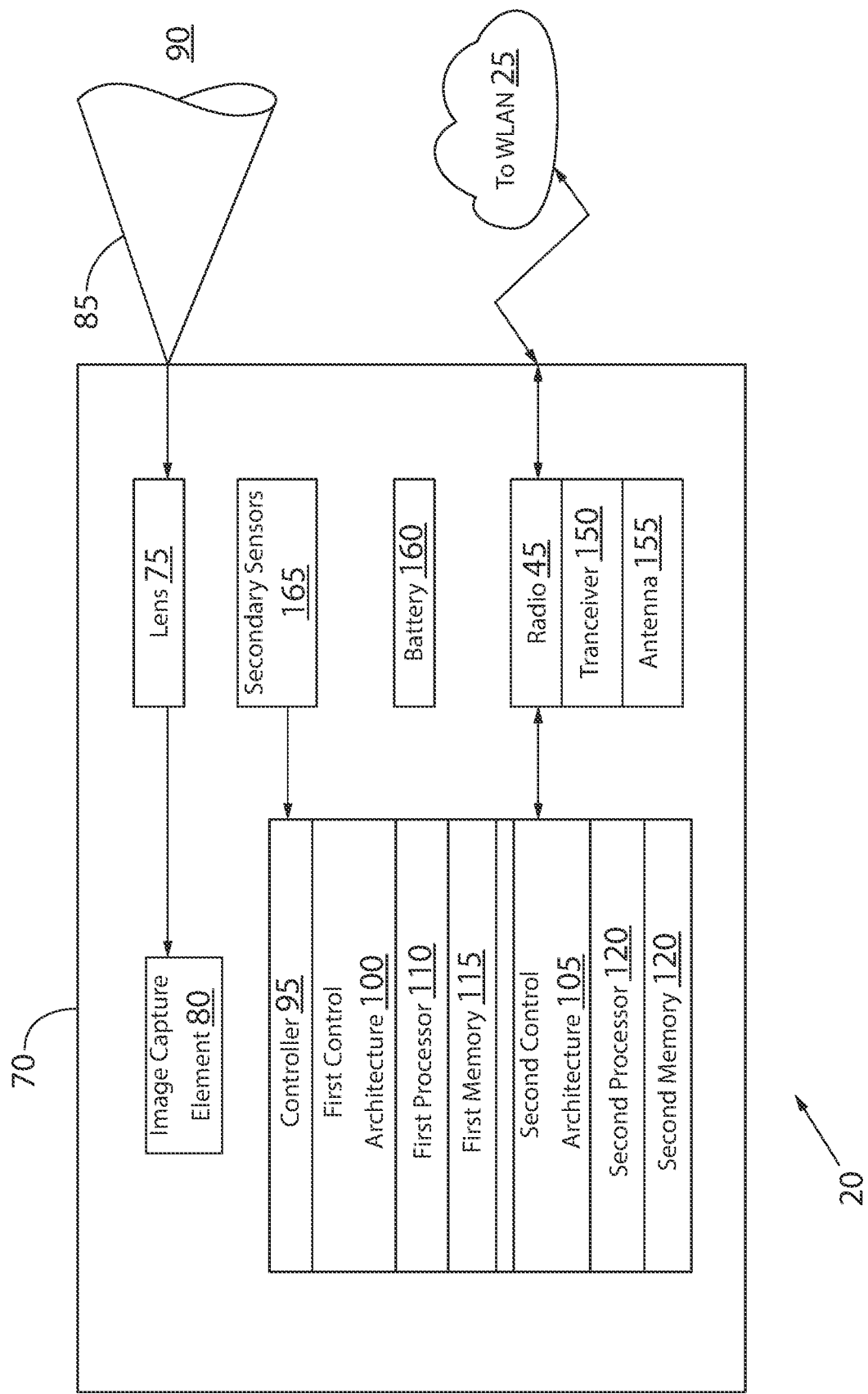
FIG. 2 is a block diagram representing a camera shown in FIG. 1.

FIG. 2 represents an example camera 20 shown in FIG. 1. In the illustration, the camera 20 has a small and compact housing 70 for enclosing and protecting the various camera components illustrated as blocks in FIG. 2. The camera 20 includes a lens 75 and an image capture element (or primary sensor) 80. The image capture element 80 can be any suitable type of image capturing device or sensor, including, for example, an area array sensor, a Charge Coupled Device (CCD) sensor, a Complementary Metal Oxide Semiconductor (CMOS) sensor, or a linear array sensor, just to name a few possibilities. The image capture element 80 may capture images in suitable wavelengths on the electromagnetic spectrum. The image capture element 80 may capture color images and/or grayscale images.

The camera 20 has a field of view 85 extending radially from the outwardly facing lens 75. The field of view 80 is a portion of the environment 90 within which the camera 20 can detect electromagnetic radiation via the lens 75 and image capture element 80. The camera 20 is configured to capture images. An image is a digital representation of a scene for the environment 90 as captured by the camera 20. Capturing an image refers to the act of obtaining and recording an image data file or stream of the digital representation. The scene is the portion of the environment 90 observed through the field of view 85. Capturing a plurality of images in a timed sequence can result in a video. Capturing a video refers to the act of obtaining and recording a video data file or stream of the digital representation.

Referring back to FIG. 2, the camera 20 has a controller 95 including a first control architecture 100 and a second control architecture 105. The first control architecture 100 includes a first processor 110 and a first memory 115, and the second control architecture 105 includes a second processor 120 and a second memory 125. While the arrangement of FIG. 2 shows the controller having dual processors and memories, it is envisioned that many other arrangements are possible, including a single control architecture having a single processor and memory.

The processors 110 and 120 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 110 and/or 120 can include a hardware circuit (e.g., an integrated circuit) configured to carry out instructions contained in program code.

The memories 115 and 120 store one or more types of instructions and/or data. The memories 115 and 120 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memories 115 and/or 120 can be a component of a processor, can be operatively connected to a processor for use thereby, or a combination of both.

The memories 115 and 125 can include various instructions stored thereon. For example, the memories 115 and 125 can store one or more modules. Modules can be or include computer-readable instructions that, when executed by a processor, cause a processor to perform the various functions disclosed herein. Example modules in one of memory 115 and 125 include a roaming trigger module, a roaming scan module, and a roaming handoff module, all of which are discussed further below. While functions may be described herein for purposes of brevity, it is noted that the functions are performed by the first processor 110 or the second processor 120 using the instructions stored on or included in the various modules described herein. Some modules may be stored remotely and accessible by a processor using, for instance, various communication devices and protocols.

In accordance with one construction, the first control architecture 100 includes a separate device from the second control architecture 105 such that they can enter and exit low power states independently of one another. As used herein, a low power state or low power mode is broadly defined as stand by, suspend, power off, hibernation, hybrid sleep, sleep, idle, and related states or modes. In one construction, the first control architecture 100 includes camera host hardware and the second control architecture 105 includes communication system-on-chip (SoC) hardware. The first control architecture 100 (e.g., the camera host hardware) performs image processing functions on image data received from the image capture element 80, and controls handling of messages received from and transmitted to the base station 30. When there are no messages to be received or transmitted, and no image processing functions to be performed, the first control architecture 100 can be powered down or placed in a lower power state. The second control architecture 105 (e.g., the communication system-on-chip hardware) controls operation of the camera 20 when the first control architecture 100 is powered down and powers up the first control architecture 100 upon the occurrence of one or more predetermined triggering events. The first control architecture 100, when awake, is the master controller of the camera 20 and functions as the host processor to the radio (discussed below) and the image capture element 80. Further discussion regarding the relationship between the first control architecture and the second control architecture will be provided below.

Before moving to other components of the camera 20, it should be understood by somebody skilled in the art that the controller 95 includes many additional conventional elements typically found in a wireless camera controller or a controller for a similar device. Further discussion regarding these components is not provided herein since the components are conventional.

The camera 20 communicates wirelessly (e.g., with the base station 30) via a radio 145. An example of a radio includes a wireless local area network (WLAN) radio. With the WLAN radio 145, the camera 20 generally communicates over a short-range wireless communication network, such as the WLAN 25. In one implementation, the radio 145 includes a transceiver 150 for transmitting and receiving signals to and from the base station 30, via an antenna 155. The transceiver 150 can be separate to or part of the second control architecture 105. The wireless communication can be as prescribed by the IEEE 802.11 standards in accordance with the Wi-Fi™ communication protocol. It is appreciated, however, that the camera 20 can be adapted to perform communications in accordance with other known or to be developed communication protocol, or even a proprietary communication protocol developed for a particular application. Also, while only a single transceiver 150 and single antenna 155 is shown, multiple transceivers and multiple antennas can be used to communicate at multiple communication frequency bands. Alternatively, the single transceiver 150 and the single radio 155 can communicate over multiple frequency bands.

The camera 20 is battery-powered by a battery (or battery pack) 160. In one implementation, the life of the battery 160 is extended by having the camera 20 normally operate in an low power mode, and only activating the camera 20, or portions of the camera 20, for necessary periods of time to perform one or more desired functions. For example, the default mode of operation of the camera 20 is a low power mode wherein the controller 95 is substantially deactivated. In this mode, the controller 95, or any deactivated portion thereof, are only activated on an "as needed" basis. In another or further implementation, the camera 20 uses an improved roaming scan power saving routine to help extend battery power.

The camera 20 can further include secondary sensors 165, which may also be used to generate an interrupt signal. For example, a secondary sensor 165 may be a microphone which generates an interrupt signal upon receiving an audio signal above a defined threshold. Alternatively, the secondary sensor 165 may be a motion sensor for sensing motion in a room, for example. Such secondary sensors 165 are useful, for example, in security situations to detect if an unauthorized entry into a particular area has occurred. Upon detecting a substantial noise and/or motion, an interrupt signal is generated, which can then activate a portion of the controller 95. Other example secondary sensors 165 include a temperature sensor, an image sensor, and a vibration sensor.

An exemplary camera capable of incorporating aspects of the invention is an Arlo Ultra brand camera available from Arlo Technologies in San Jose, Calif., US. Before moving to other components of the system 10, it should be understood by somebody skilled in the art that the camera 20 includes many additional conventional components typically found in a wireless camera. Further discussion regarding these components is not provided herein since the components are conventional.

Figure 3:
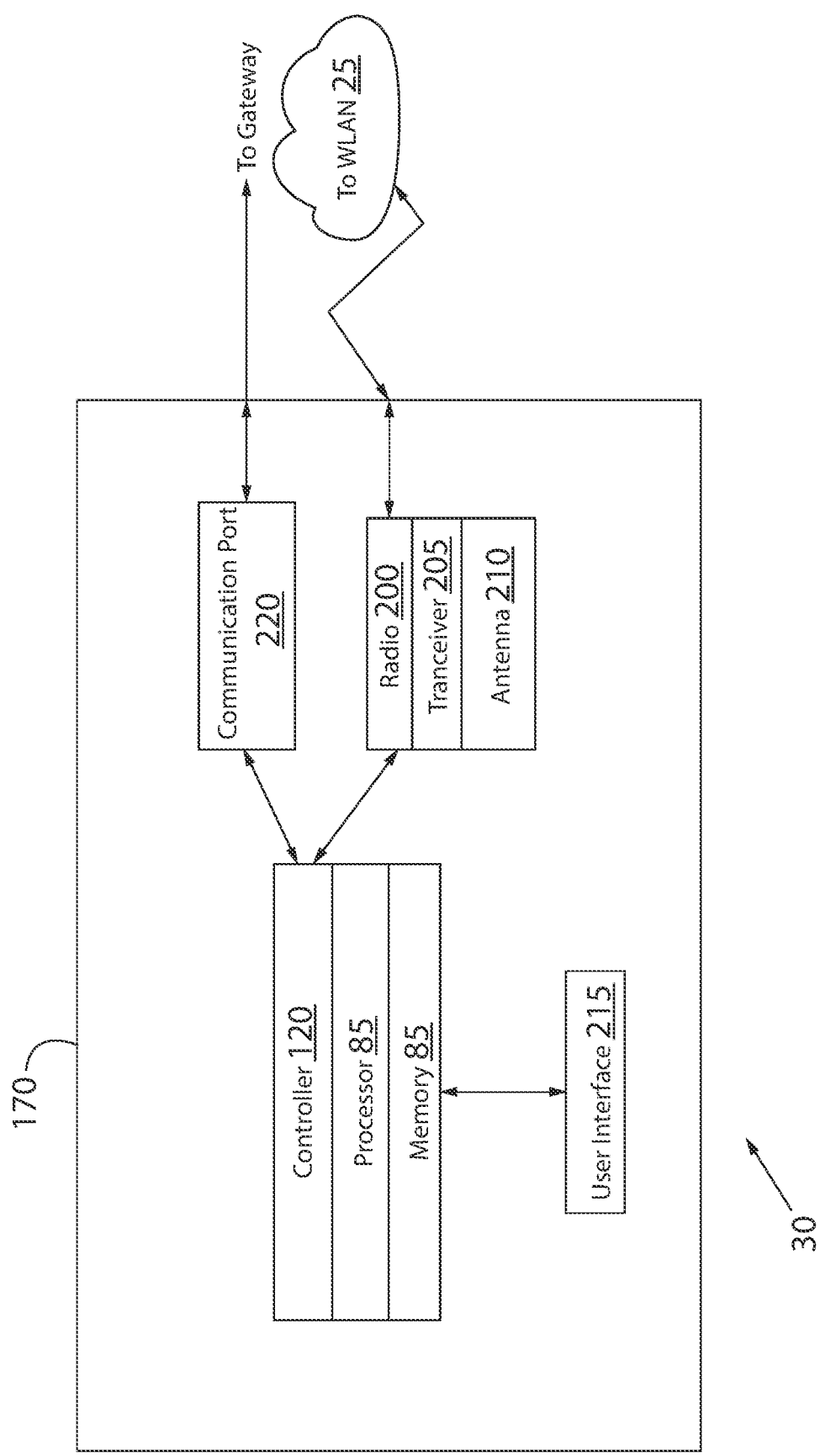
FIG. 3 is a block diagram representing a base station shown in FIG. 1.

Turning now to FIG. 3, the figure represents an example of the base station 30 shown in FIG. 1. The access point 55 can have a similar construction to the base station 30. In the illustration, the base station 30 has a housing 175 for enclosing and protecting the various components illustrated as blocks in FIG. 3. The base station 30 has a controller 180, including a processor 185 and a memory 190. While the arrangement of FIG. 3 shows a single processor 185 and a single memory 190, it is envisioned that many other arrangements are possible. For example, multiple elements of the base station 30 can include a distinct processor and memory.

The processor 185 can include a component or group of components that are configured to execute, implement, and/or perform any of the processes or functions described herein for the base station 30 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 185 can include a hardware circuit (e.g., an integrated circuit) configured to carry out instructions contained in program code. In arrangements in which there are a plurality of processors, such processors can work independently from each other or one or more processors can work in combination with each other.

The base station 30 includes a memory 190 for storing one or more types of instructions and/or data. The memory 190 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 190 can be a component of the processor 185, can be operatively connected to the processor 185 for use thereby, or a combination of both.

In one or more arrangements, the memory 190 can include various instructions stored thereon. For example, the memory 190 can store one or more modules. Modules can be or include computer-readable instructions that, when executed by the processor 185, cause the processor 185 to perform the various functions disclosed for the module. While functions may be described herein for purposes of brevity, it is noted that the functions are performed by the processor 185 using the instructions stored on or included in the various modules. Some modules may be stored remotely and accessible by the processor 185 using, for instance, various communication devices and protocols.

Before moving to other components of the base station 30, it should be understood by somebody skilled in the art that the controller 180 includes many additional conventional elements typically found in a base station controller. Further discussion regarding these components is not provided herein since the components are conventional.

The base station 30 communicates wirelessly (e.g., with the cameras 20A-C) via a radio 200. An example of a radio includes a wireless local area network (WLAN) radio. With the WLAN radio 200, the base station 30 generally communicates over a short-range wireless communication network, such as the WLAN 25. In one implementation, the radio 200 includes a transceiver 205 for transmitting and receiving signals to and from the base station 30, via an antenna 210. The transceiver 205 can be separate to or part of the controller 180. The wireless communication can be as prescribed by the IEEE 802.11 standards in accordance with the Wi-Fi™ communication protocol. It is appreciated, however, that the base station 30 can be adapted to perform communications in accordance with other known or to be developed communication protocol, or even a proprietary communication protocol developed for a particular application. Also, while only a single transceiver 205 and single antenna 210 is shown, multiple transceivers and multiple antennas can be used to communicate at multiple communication frequency bands. Alternatively, the single transceiver 205 and the single radio 210 can communicate over multiple frequency bands.

The base station 30 includes the user interface 215. The user interface 215 can include an input apparatus and an output apparatus. The input apparatus includes a device, component, system, element, or arrangement or groups thereof that enable information/data to be entered into the base station 30 from a user. The output apparatus includes any device, component, or arrangement or groups thereof that enable information/data to be presented to the user. The input apparatus and the output apparatus can be combined as a single apparatus, such as a touch screen commonly used by many electronic devices.

The base station 30 includes a communication port 185, which is configured to provide a communication interface between a larger computer network, such as the Internet 50 via the gateway 45, for example, and the wireless camera network 15.

In one construction, since the base station 30 is powered by an enduring power source (e.g., power outlet), it is not necessary for the base station 30 to be operated in a default sleep mode, although this is not precluded. An exemplary base station capable of incorporating aspects of the invention is an Arlo SmartHub brand base station available from Arlo Technologies in San Jose, Calif., US. Before moving to the operation of the system 10, it should be well understood by somebody skilled in the art that the base station 30 includes many additional conventional components typically found in a base station or access point.

For the camera 20 described above, it should be appreciated that conserving the power of the battery 160 and avoiding undue power drainage of the battery 160 is desirable. By conserving power and avoiding undue power drainage, the battery 160 requires less frequent recharging and/or replacement, which is not only more convenient but also less expensive for the user.

During normal operation, the camera 20 attempts to associate with an AP at a broadcast frequency (e.g., 2.4 GHz or 5 GHz) after initial power ON. For example, the camera 20 can associate with the base station 30. Once associated with the base station 30, the camera 20 may transition to a low power state. In this low power state, all non-essential components or units of the camera 20 are powered down or in a sleep mode in order to conserve power. In one embodiment, the first control architecture 100, and more specifically the first processor 110, are placed in an idle state, to be awakened by the second control architecture, and more specifically the second processor 120, upon the occurrence of a predetermined triggering event. In the low power state, information pertaining to the last state of the controller 95 is maintained in the first memory 115, as necessary, so that when the first control architecture is awakened, it may resume operations from its last state before it entered the low power mode.

The base station 30 broadcasts a beacon frame, among other communication, at one or more broadcast frequencies. A beacon frame is one of the management frames in IEEE 802.11 based WLANs. A beacon frame contains information about the network and is transmitted periodically. The beacon frame serves to announce the presence of a wireless LAN and to synchronize the members of the service set. When a wireless node (e.g., camera 20) receives a beacon frame, it receives information about the capabilities and configuration of that network. After associating with a network, such as network 55, the second control architecture 105 of the camera 20 continues to scan for beacons.

A benefit of beacons is to enable the camera 20 to have power saving modes. For example, the base station 30 holds on to packets destined for the nodes that are currently idled. In one operation, the camera 20, when in the lower power state, periodically listens for beacons from the base station. The camera 20 may skip a predetermined number of beacons then attempt to capture the next beacon. Contained in the beacon is a Traffic Indication Map (TIM) or a Delivery Traffic Indication Map (DTIM), which contains information indicating whether information or a message is waiting to be sent to the camera 20. If the TIM or DTIM indicates that the camera 20 has a message waiting to be sent to the camera 20, this will trigger the second processor 120 to wake the first processor 110, which will then request the message or data from the base station 30. Upon receiving the message, the first processor 110 will process any instructions or data contained in the message and, thereafter, the camera 20 returns to the low power state with the first control architecture 100 and other non-essential units powered down or in a sleep mode. In one construction, the first processor 110, the first memory 115, and image capture element 80 are devices that are powered down when the camera 20 is associated with the base station 30 but in an idle state. In this state, the second processor 120, the second memory 125, and the radio 127 are placed in low power modes.

If an event occurs that requires the attention of the first processor 110 and the first processor 110 is already powered up, then the second processor 115 will simply inform the first processor of an interrupt. If the first processor 110 is in a low power state when the event occurs, the second processor 120 first wakes the first processor and then informs it of the interrupt. When the first processor 110 has completed all of its operations it will again power down and enter a low power state. Before powering down, the first processor 110 saves its current state information, and any other desired information, in the first memory 115.

In a Wi-Fi™ network, for example, roaming is when a wireless electronic device (e.g., one of node cameras 12A-C) moves around in an area with multiple access points (e.g., base station 30 and access point 55). Roaming is often used to find an access point that provides better service for the client electronic device. Example service considerations include high data throughput support and better coverage range. Separate from roaming due to movement is frequency roaming. Frequency roaming is when a wireless electronic device (e.g., one of node cameras 12A-C) changes frequency bands and/or frequency channels. Various reasons can cause frequency roaming, including interference in a current frequency channel.

In battery-powered Wi-Fi™ devices, high power consumption is a concern in the roaming process. The following items may contribute to high power consumptions in the roaming process.

Using a fixed roaming scan time interval, but the device cannot find the roaming candidate during the interval. Example reasons include that the candidate is not available, strong channel interference, etc. This issue causes frequent unsuccessful roaming scans and selection operation.

A device does not go to a power saving mode after unsuccessful roaming operation and starts a next roaming cycle.

Scanning all Wi-Fi™ available channels instead of selected channels if the electronic device already knows which channel the device should roam to. Scanning any unused channels consumes extra power on the device and shortens battery life.

If the target access point is known or unknown, an electronic device typically chooses a single roaming scan algorithm (e.g. active scan or passive scan) to cover all the types of access points, which leads to un-optimized power consumption on the electronic device.

Figure 4:
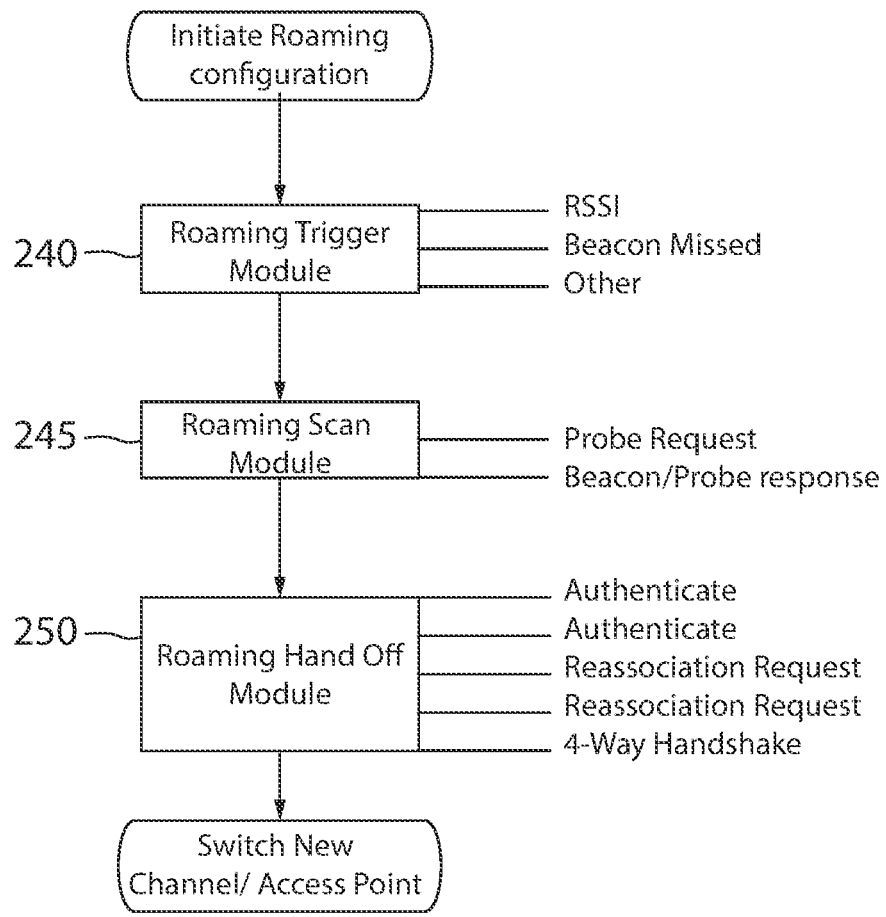
FIG. 4 is a block diagram of modules for performing a roaming process.

During a roaming process, the electronic device may determine a better access point and/or frequency channel is available and automatically switches to the new access point/channel. The transition may include a different channel which has better received signal strength. Roaming can occur in three phases, each of which has a specific purpose. FIG. 4 is a representative block diagram of the roaming process.

Upon initiating a roaming process, roaming configuration parameters may be acquired from memory. An example roaming configuration parameter can be a received signal strength indicator (RSSI) interrupt threshold.

The roaming trigger module 240 receives an interrupt indicating a roaming trigger has been met. For example, the RSSI threshold can be traversed, a beacon may have been missed, or another interrupt is provided to the roaming trigger module 240. In the disclosed construction, of FIG. 2, the second control architecture 105 can identify the interrupt and provide the interrupt to the roaming trigger module 240 maintained at the first control architecture 100. For example, if the second control architecture 105 misses a beacon, then the second control architecture 105 wakes the first control architecture 100 (and specifically the first processor 110), and provides the reason for the interrupt to first control architecture 100. The first control architecture 100, executes the roaming process modules of FIG. 4, including the roaming trigger module 240 receiving the interrupt. However, other control architectures may implement the roaming trigger process of FIG. 4 differently. After the roaming trigger module 240 determines it has a valid interrupt, it proceeds to a roaming scan module 245.

Next, the roaming scan module 245 is executed by the first processor 110 to perform a roaming candidate search. The roaming candidate search uses an active scan and/or a passive scan method to collect all potential roaming candidates and select a final roaming candidate. For example, the roaming scan module 245 can initiate a probe request, via the second control architecture 105, as part of an active scan process and receive a probe response responding to the probe request. Alternatively, the roaming scan module 245, via the second control architecture 105, can analyze channels for a beacon. The roaming scan module 245 may identify one or more access points/channels and may select a best candidate of the identified access points. If the identified access point/channel is new or different from a currently used access point, then the process proceeds to a roaming handoff module 250.

The roaming handoff module 250 has the node camera 20 switch to a new channel and/or a new access point based on information provided by the roaming scan module 245. Depending on the environment, the cause for the roaming process, and the result of the roaming scan module 245, the roaming handoff module 250 exchanges messages with the selected access point. Example messages can include an authentication message, a reassociation request, a four-way handshake, or similar messages as is known in the art. The process completes with the camera 20 switching to the new channel and/or access point.

Various alternative and cumulative techniques can be used for increasing battery life as part of the roaming process. First, the node camera 20 can go to a low power mode in the middle of the roaming scan process. Second, a set of roaming scan interval related parameters (e.g., an exponential roaming scan backup algorithm) can be used. Third, instead of using one roaming scan algorithm to cover all the roaming cases, multiple roaming scan algorithms or combination of roaming scan algorithm may be used. Fourth, instead of scanning all the possible channels, a limited scan channel list can be used.

In one implementation, the communicated configuration parameters include an initial roaming scan interval ("IRSI"), a roaming scan interval multiplier ("RSIM"), and a max roaming scan interval ("MRSI"). When the roaming scan process has been triggered, one implementation initiates the roaming scan immediately as discussed with FIG. 4. If the roaming operation is unsuccessful, the first control architecture starts a roam scan timer ("RST") equal to the IRIS value (i.e., RST=IRIS) and places the camera 20 (or a portion of the camera 20) into a low power mode.

When the RST expires, the first control architecture 100, and more specifically, first processor 110, wakes up and the camera 20 performs the roaming scan process again. If the roaming scan process fails, the first processor 110 sets the RST to $$RST = RST * RSIM \qquad (1)$$

The first processor 110 compares the resultant RST value with the MRSI value and sets the RST value to the smaller value. The first processor 110 starts the roam scan timer ("RST") and enters the camera 20 into the low power mode. The camera 20 then repeat the process of roaming and sleeping until a suitable access point and/or channel is identified.

In some operations when the camera 20 enters the roaming process because the RSSI is too low, the first control architecture 100 can enter the low power mode when the roaming process fails and the second control architecture 105 is otherwise in the connected state and still using the original serving channel. The first control architecture 100 wakes up once the RST expires. This will provide better power saving performance to the camera 20.

In some operations, since the roaming scan process can use either active roaming scan or passive roaming scan, the roaming scan module 245 should not be restricted to use only a single scan algorithm to cover all cases. The roaming scan module 245 can use one of the following techniques.

If the camera 20 is doing an initial roaming scan and does not have any prior knowledge of roaming candidate APs, the camera 20 could consider to scan all of the available channels on any available bands (e.g., 2G or 5G band). If roaming process is the initial scan, the camera 20 could use active scan to scan all 2G channels and selected 5G channels (excluding dynamic frequency selection (DFS) channels). The camera could use passive scan to scan all 5G DFS channels.

If the camera 20 is performing a sub-sequence roaming scan and does not have any prior knowledge of roaming candidate access points, then the camera should can use passive scan to all the 2G and 5G channels. One reason for this alternative is passive scans consume less power compared to active scans. If the roaming process is not the initial roaming scan, the success rate of roaming operation may be low.

If the camera 20 already has the prior knowledge of the roaming candidate, the camera 20 should only use active scan to scan this/these channel(s). The rationale behind this alternative is, since the roaming channel list is short, the camera 20 can afford to use active scan instead of passive scan to find the final roaming candidate faster. The camera doesn't consume a lot of power if the roaming scan channel list is short.

If the camera 20 already has prior knowledge of the roaming candidate and roaming latency is not the concern, the camera 20 may use passive scan to scan limited roaming candidate channels. This alternative can save more power by using passive scan.

Figure 5:
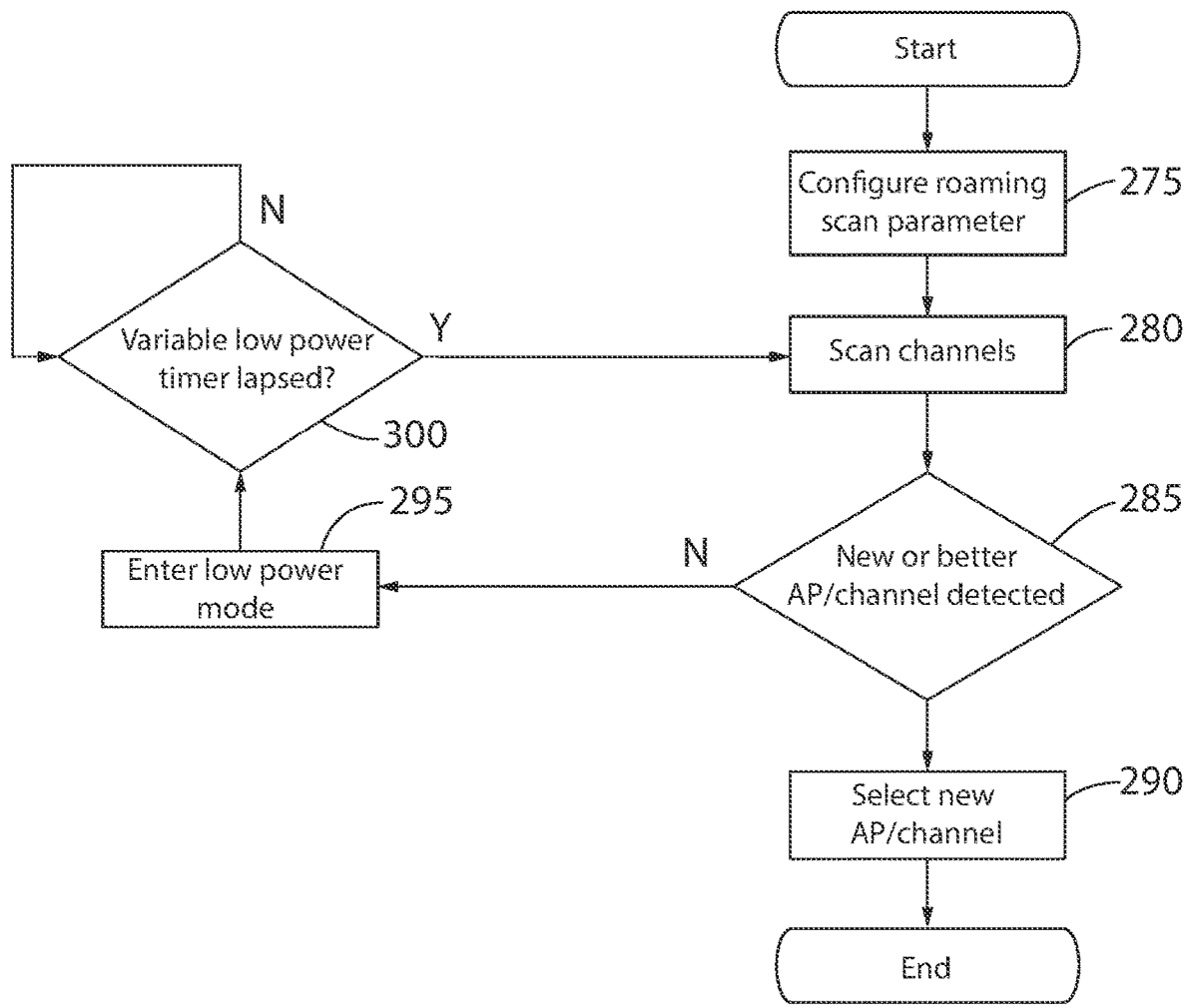
FIG. 5 is a method of operating the camera represented in FIG. 2.

One detailed implementation for performing a roaming scan is shown in FIG. 5. At block 270, the first processor 110 configures the roaming parameters for the roaming scan process. Example parameters include the initial roaming scan interval ("IRSI"), the roaming scan interval multiplier ("RSIM"), and the max roaming scan interval ("MRSI"), as discussed above. Other parameters can be used to help program a variable scan interval, and a variable low power mode timer.

At block 280, the first processor 110, with the help of the second control architecture 105, scans channels for a new or better access point and/or channel. The scan can be an active and/or passive scan and can be over multiple frequency bands, all of which was discussed above. If a new or better access point and/or channel is detected (block 285), the first processor 110 selects (block 290) the new access point and/or channel as discussed with FIG. 4; otherwise, the first processor 110 enters a low power mode (block 295). The first processor 110 stays in the low power mode until a variable low power mode timer lapses (block 300). The value of the variable low power timer can change as was described earlier with the variable RST, above. When the timer lapses, the method returns to block 280.

Accordingly, the invention provides a new and useful roaming scan power saving technique. Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

A particular software module may comprise a single instruction or many instructions, and may be distributed over several different code segments, among different programs, and across several computer-readable storage media.

In addition, data being tied or rendered together in a database record may be resident in the same computer-readable storage medium, or across several computer-readable storage media, and may be linked together in fields of a record in a database across a network.

The block diagrams and flowcharts in the figures illustrate the architecture, functionality, and operation of possible implementations of systems, methods, and computer program products according to various embodiments. In some embodiments, one element may be designed as multiple elements or multiple elements may be designed as one element. In some embodiments, an element shown as an internal component of another element may be implemented as an external component and vice versa. Furthermore, elements may not be drawn to scale. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and which, when loaded in a processing system, is able to carry out these methods.

Nothing in this application is considered critical or essential to the present invention unless explicitly indicated as being "critical" or "essential." In addition, the individual components need not be assembled in the disclosed configuration but could be assembled in virtually any configuration. Furthermore, all the disclosed features of each disclosed embodiment can be combined with, or substituted for, the disclosed features of every other disclosed embodiment except where such features are mutually exclusive.

What is claimed is:

1. A method of conserving power of a battery in a battery-powered electronic device, the electronic device being wirelessly communicable over a plurality of frequency channels with an access point in a wireless local area network (WLAN), the method comprising:
    establishing a wireless communication connection between the electronic device and the access point over one of the plurality of frequency channels;
    triggering a first roaming scan with the electronic device for communication with the access point over the WLAN;
    scanning an alternative one or more of the plurality of frequency channels during the first roaming scan;
    determining whether the first roaming scan is unsuccessful;
    if the first roaming scan is unsuccessful, placing the electronic device in a low power state for a time period after the first roaming scan is unsuccessful while maintaining the established wireless communication connection between the electronic device and the access point over the one of the plurality of frequency channels; and
    after the time period lapses, scanning the alternative one or more of the plurality of frequency channels during a second roaming scan.

2. The method of claim 1, wherein the WLAN has a plurality of access points including the access point, and wherein triggering a first roaming scan includes triggering the first roaming scan with the electronic device for communication with the plurality of access points over the WLAN.

3. The method of claim 1, and further comprising:
    searching to identify a quality communicable frequency channel with the access point among the plurality of frequency channels; and
    determining that the second roaming scan is successful if a quality communicable frequency channel with the access point is identified.

4. The method of claim 1, wherein scanning one or more of the plurality of frequency channels includes performing an active roaming scan routine of a plurality of communicable frequency channels.

5. The method of claim 1, wherein scanning one or more of the plurality of frequency channels includes performing a passive roaming scan routine of a plurality of communicable frequency channels.

6. The method of claim 1, wherein placing the electronic device in a low power state includes causing at least a portion of the electronic device to enter a lower power mode while maintaining the established wireless communication connection between the electronic device and the access point over the one of the plurality of frequency channels.

7. The method of claim 1, further comprising
    setting a roam scan timer equal to an initial roam scan interval, wherein the time period is equal to the roam scan timer;
    determining whether the second roaming scan is unsuccessful;
    if the second roaming scan is unsuccessful, increasing the duration of the roam scan timer;
    placing the electronic device in the low power state for a second time period after the second roaming scan is unsuccessful while maintaining the established wireless communication connection between the electronic device and the access point over the one of the plurality of frequency channels, the second time period being equal to the increased duration of the roam scan timer.

8. The method of claim 7, wherein increasing the duration of the roam scan timer includes multiplying the initial roam scan timer by a multiplier value.

9. The method of claim 8, wherein increasing the duration of the roam scan timer includes determining if the resultant of multiplying the initial roam scan timer is greater than a max value and setting the roam scan timer to the max value.

10. The method of claim 1, further comprising the step of transmitting image capture data from the electronic device to the access point if the first roaming scan is unsuccessful.

11. A method of conserving power of a battery in a battery-powered electronic device, the electronic device wirelessly being communicable over a plurality of frequency channels with an access point in a wireless local area network (WLAN), the method comprising:

establishing a wireless communication connection between the electronic device and the access point over one of the plurality of frequency channels;

triggering a first roaming scan with the electronic device for communication with the access point over the WLAN;

scanning one or more of the plurality of frequency channels during the first roaming scan;

determining whether the first roaming scan is unsuccessful;

if the first roaming scan is unsuccessful, placing the electronic device in a power saving mode for a first time period while maintaining the established wireless communication connection between the electronic device and the access point over the one of the plurality of frequency channels;

after the first time period lapses, scanning the one or more of the plurality of frequency channels during a second roaming scan;

determining whether the second roaming scan is unsuccessful;

if the second roaming scan is unsuccessful, placing the electronic device in the power saving mode for a second time period while maintaining the established wireless communication connection between the electronic device and the access point over the one of the plurality of frequency channels, the second time period being longer than the first time period; and after the second time period lapses, scanning the one or more of the plurality of frequency channels during a third roaming scan.

12. The method of claim 11, wherein the WLAN has a plurality of access points including the access point, and wherein triggering a first roaming scan includes triggering the first roaming scan with the electronic device for communication with the plurality of access points over the WLAN.

13. The method of claim 11, and further comprising:
searching to identify a quality communicable frequency channel with the access point among the plurality of frequency channels; and
determining the third roaming scan is successful when a quality communicable frequency channel with the access point is identified.

14. The method of claim 13, wherein scanning one or more of the plurality of frequency channels includes performing an active roaming scan routine of a plurality of communicable frequency channels.

15. The method of claim 13, wherein scanning one or more of the plurality of frequency channels includes performing a passive roaming scan routine of a plurality of communicable frequency channels.

16. The method of claim 13, further comprising the step of transmitting image capture data from the electronic device to the access point when the electronic device is in the power saving mode.

17. The method of claim 11, wherein the WLAN includes a plurality of access points, and wherein the triggering the first roaming scan includes triggering the first roaming scan with the electronic device for communication with either the first access point or the second access point over the WLAN.

18. The method of claim 11, wherein the electronic device is wirelessly communicable over a first frequency band with the plurality of frequency channels and wirelessly communicable over a second frequency band with a second plurality of frequency channels, and wherein the method further comprises scanning one or more of the second plurality of frequency channels during the first roaming scan.

19. The method of claim 18, wherein the first frequency band is 2.4 GHz and the second frequency band is 5 GHz.

20. The method of claim 11, wherein the scanning the one or more of the plurality of frequency channels includes active scanning, and wherein the scanning the one or more of the second plurality of frequency channels includes passive scanning.

* * * * *